United States Patent
Kim et al.

(10) Patent No.: US 7,090,162 B2
(45) Date of Patent: Aug. 15, 2006

(54) APPARATUS AND METHOD OF WINDING OPTICAL FIBER SENSOR COIL FOR FIBER OPTIC GYROSCOPE

(75) Inventors: Chun Gon Kim, Daejeon (KR); Hyuk Jin Yoon, Gwangju (KR); Sang Guk Kang, Busan (KR); Won Jun Lee, Yangsan-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 116 days.

(21) Appl. No.: 10/732,772

(22) Filed: Dec. 9, 2003

(65) Prior Publication Data

US 2005/0098675 A1    May 12, 2005

(30) Foreign Application Priority Data

Dec. 10, 2002    (KR) .................. 10-2002-0078272

(51) Int. Cl.
*B21C 47/14* (2006.01)
*H01F 41/06* (2006.01)

(52) U.S. Cl. ............................. 242/441.1; 242/439.5

(58) Field of Classification Search ................ 242/484, 242/445.1, 439.5, 441.1; 356/465
See application file for complete search history.

(56) References Cited

U.S. PATENT DOCUMENTS

| | | | |
|---|---|---|---|
| 3,667,203 A * | 6/1972 | Koschatzky et al. ..... | 242/439.5 |
| 4,781,461 A * | 11/1988 | Baron et al. ............... | 356/465 |
| 4,856,900 A | 8/1989 | Ivancevic | |
| 5,168,539 A * | 12/1992 | Negishi et al. ............. | 385/123 |
| 5,301,884 A * | 4/1994 | Horneman ................ | 242/440.1 |
| 5,351,900 A | 10/1994 | Torney | |
| 5,405,485 A * | 4/1995 | Henderson et al. ......... | 156/425 |

* cited by examiner

*Primary Examiner*—Kathy Matecki
*Assistant Examiner*—William E. Dondero
(74) *Attorney, Agent, or Firm*—Graybeal Jackson Haley LLP

(57) ABSTRACT

An apparatus for winding, in the form of a quadrupole, an optical fiber used for forming a sensor coil of a fiber optic gyroscope. A center shaft is supported by a pair of support sections. A cylindrical spool is fitted around the center shaft. A pair of winding disks are arranged adjacent to both ends of the spool so that they can be rotated about the center shaft. A pair of reels are mounted to facing surfaces of the winding disks so that both halves of the optical fiber to be wound on the spool can be wound on the reels, respectively. The winding disks can be rotated at the same velocity in opposite directions. The cylindrical spool is installed to be reciprocated along an axis of the center shaft. The respective reels mounted to the winding disks are spaced apart from each other by a predetermined interval.

8 Claims, 3 Drawing Sheets

APPARATUS AND METHOD OF WINDING OPTICAL FIBER SENSOR COIL FOR FIBER OPTIC GYROSCOPE

PRIORITY CLAIM

This application claims priority from Korean Patent Application No. 10-2002-0078272 filed 10 Dec. 2002, which is herein incorporated by reference.

FIELD OF THE INVENTION

The present invention relates to an apparatus and a method for winding an optical fiber in the form of a quadrupole, which can be adapted to the manufacture of an optical fiber coil used for a fiber optic gyroscope.

DESCRIPTION OF THE PRIOR ART

An optical fiber sensor coil used in a fiber optic gyroscope should be wound in the form of a quadrupole so as to decrease an error rate caused by changes in surrounding environment. In order to form the quadrupole, winding the optical fiber should be started from a middle portion of the optical fiber.

A conventional method for winding an optical fiber will be described hereafter. First, in a state wherein a length of the optical fiber is divided into halves, both halves of the optical fiber are respectively wound on different reels. Then, relating the optical fiber wound on two reels, the optical fiber is wound on a rotating spool. At this time, if both reels are held fixed, as the spool is rotated, one half of the optical fiber is wound on the spool and the other half of the optical fiber is unwound from the spool. To prevent this problem, while one half of the optical fiber wound on a first reel is wound on the spool, a second reel is arranged by coupling the shaft of the second reel with that of the spool arranged to rotate integrally with the spool. After winding a first layer is finished, the second reel coupled to the shaft of the spool is decoupled from the spool shaft and the optical fiber is released from the second reel to be wound on the spool. At this time, the first reel from which the optical fiber is formerly released is fixedly coupled to the spool shaft. As a result, in the conventional method, whenever each layer of the optical fiber is wound on the spool, one of the two reels is coupled to the shaft of the spool on which the optical fiber is wound, and the optical fiber is released from the other reel to be wound on the spool. This conventional method suffers from defects in that, since the two reels must be alternately fixed to the shaft of the spool whenever respective layers of the optical fiber are wound on the spool, inconvenience is caused when winding a very long optical fiber. Further, because only one layer of the optical fiber is wound at a time, a winding speed is relatively slow.

SUMMARY OF THE INVENTION

An object of the present invention is to provide an apparatus and a method for winding an optical fiber in the form of a quadrupole without interruption.

In order to achieve the above object, according to one aspect of the present invention, there is provided an apparatus for winding an optical fiber in the form of a quadrupole for forming a sensor coil of a fiber optic gyroscope, comprising: a center shaft supported by a pair of support members; a cylindrical spool fitted around the center shaft; a pair of winding disks arranged adjacent to both ends of the spool in such a manner that they can be rotated about the center shaft; and a pair of reels detachably mounted to facing surfaces of the winding disks, both halves of the optical fiber to be wound on the spool being wound on the reels, respectively; wherein the winding disks can be rotated with respect to the spool at the same velocity in opposite directions, the cylindrical spool is installed to be reciprocated along an axis of the center shaft, and the respective reels mounted to the winding disks are spaced apart from each other by a predetermined interval.

According to another aspect of the present invention, there is provided a method for winding an optical fiber in the form of a quadrupole for forming a sensor coil of a fiber optic gyroscope, comprising the steps of: (a) winding both halves of the optical fiber on first and second reels which are mounted to first and second winding disks, respectively; (b) setting the optical fiber extending from the respective reels on a spool which is positioned between the first and second winding disks; (c) aligning the first reel with one end of the spool and the second reel outward of said one end of the spool, and rotating in a first direction the first winding disk to which the first reel is mounted, so that the optical fiber wound on the first reel is started to be wound on the spool toward a middle part of the spool to form a first winding layer; (d) when the second reel is aligned with one end of the spool, rotating the second winding disk to which the second reel is mounted in a second direction opposite to the first direction so that a second winding layer is simultaneously formed on the first winding layer; (e) when the first winding layer formed by the first winding disk reaches the other end of the spool, interrupting the rotation of the first winding disk, and continuously rotating the second winding disk until the second winding layer reaches the other end of the spool to complete formation of the first and second winding layers; and (f) repeating the steps (c) through (e) in a reverse order to simultaneously form third and fourth winding layers on the first and second winding layers.

In the case of winding an optical fiber while rotating a spool on which the optical fiber is to be wound, a problem is caused in that, when one half of the optical fiber, which is wound on one reel, is wound on the spool, the other half of the optical fiber cannot but be unwounded from the spool. To prevent this problem, it is necessary to wind an optical fiber while a spool on which the optical fiber is to be wound is fixed. In consideration of this, in the present invention, two reels for releasing halves of an optical fiber are respectively mounted on a pair of winding disks which are symmetrically positioned adjacent to both ends, respectively, of a spool to be rotated in opposite directions. Thus, by rotating the disks in opposite directions while maintaining the spool not to be rotated, both halves of the optical fiber are wound on the spool. As the disk implements one revolution, a shaft of the spool on which the optical fiber is wound is moved forward by a distance corresponding to a thickness of the optical fiber, whereby the optical fiber can be wound over the entire length of the spool. Hence, according to the present invention, since two optical fiber layers are released from the two reels can be simultaneously wound on the spool, when compared to the conventional method in which the releasing reels must be alternated when every optical fiber layer is wound on the spool, it is possible to form a quadrupole winding in a quick and efficient manner.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
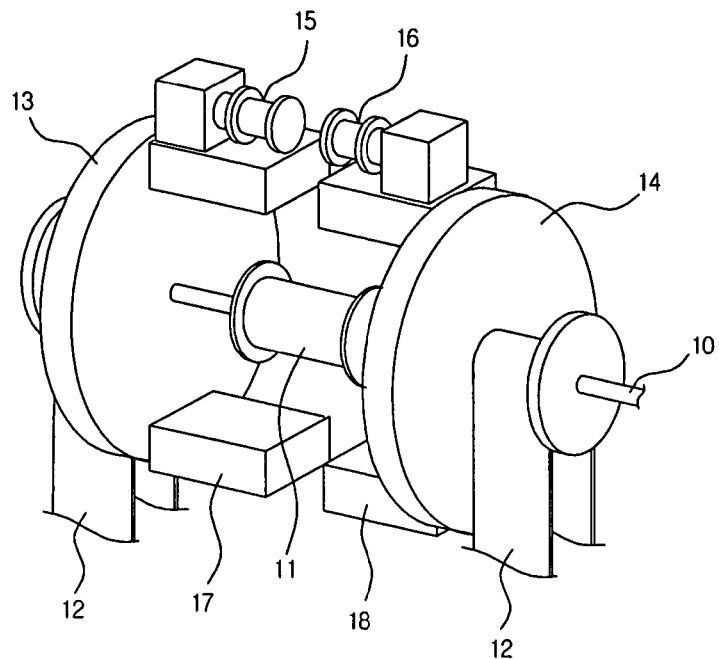
FIG. 1 is a perspective view illustrating an apparatus for winding an optical fiber in the form of a quadrupole in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a perspective view illustrating an apparatus for winding an optical fiber in the form of a quadrupole in accordance with an embodiment of the present invention. The winding apparatus includes a spool 11, which is fitted around a center shaft 10. To allow an optical fiber to be wound thereon, the spool 11 has substantially a cylindrical configuration. Also, in order to delimit a winding range of the optical fiber, a pair of inclined projections are formed at both ends of the spool 11, respectively. Both ends of the center shaft 10 are supported by a pair of support sections 12, respectively. In this preferred embodiment of the present invention, the center shaft 10 and the spool 11 are not rotated with respect to the support sections 12 and, instead the spool 11 is fitted around the center shaft 10 in a manner that the spool 11 can be moved along an axis of the center shaft 10.

Adjacent to both ends of the spool 11, a pair of winding disks 13 and 14 is fitted around the center shaft 10 at positions, which are symmetrical to each other. The winding disks 13 and 14 are rotated at the same velocity in opposite directions by driving mechanisms (not shown). As the driving mechanisms for driving the winding disks, the conventional disk rotating mechanisms may be employed. Preferably, the driving mechanisms are respectively built in the support sections 12. A pair of reels 15 and 16 is mounted to facing surfaces of and adjacent to the outer edges of the winding disks 13 and 14, respectively. Both halves of the optical fiber to be eventually wound on the spool 11 are initially wound on the reels 15 and 16, respectively. Preferably, the reels 15 and 16 are mounted to the winding disks 13 and 14 along with their respective tension adjustors, which are shown in the shape of boxes in the drawings. The two reels 15 and 16 are held separated from each other by a predetermined interval 'd'. If the winding disks 13 and 14 are rotated with respect to the spool 11 in opposite directions, the reels 15 and 16 mounted to the winding disks 13 and 14 are also integrally rotated therewith to release the optical fiber. Since the spool 11 is fitted around the center shaft 10 in a manner that it can be moved along the axis of the center shaft 10, each time the respective winding disks 13 and 14 implement one revolution, the spool 11 is moved by a distance corresponding to a thickness of the optical fiber. A pair of balancing members 17 and 18 is secured to the facing surfaces of the winding disks 13 and 14 so that the balancing members 17 and 18 are positioned opposite to the reels 15 and 16, respectively, around the center shaft 10. The balancing members 17 and 18 have the same shape and weight as the reels 15 and 16 so as to prevent vibration from being generated due to the weights of the reels 15 and 16 when the winding disks 13 and 14 are rotated. The number of balancing member(s) provided to each winding disk is not limited to one, and instead, two or more balancing members may be used as occasion demands.

Hereafter, a method for forming a quadrupole winding using the winding apparatus shown in FIG. 1 will be described with reference to FIGS. 2A through 2D. First, the optical fiber wound on the left and right reels 15 and 16 is appropriately set on the spool 11. At this time, the left reel 15 is located to be aligned with a right end of the spool 11, and the right reel 16 is positioned separately from the right end of the spool 11 by the interval 'd'. In this state, the left winding disk 13 is rotated, by which one half of the optical fiber 'L' of the left reel 15 is wound on the spool 11. At this time, the right winding disk 14 is held fixed with respect to the spool 11. As one half of the optical fiber 'L' is wound on the spool 11, the spool 11 is moved rightward, and thereafter, a distal end of the wound optical fiber is aligned with the left reel 15 as shown in FIG. 2. Every time the winding disk implements one revolution, the spool 11 can be moved through a pre-selected distance by an external driving arrangement, or can be slidingly moved on the center shaft 10 due to the tension of the optical fiber wound on the spool 11.

Figure 2A:
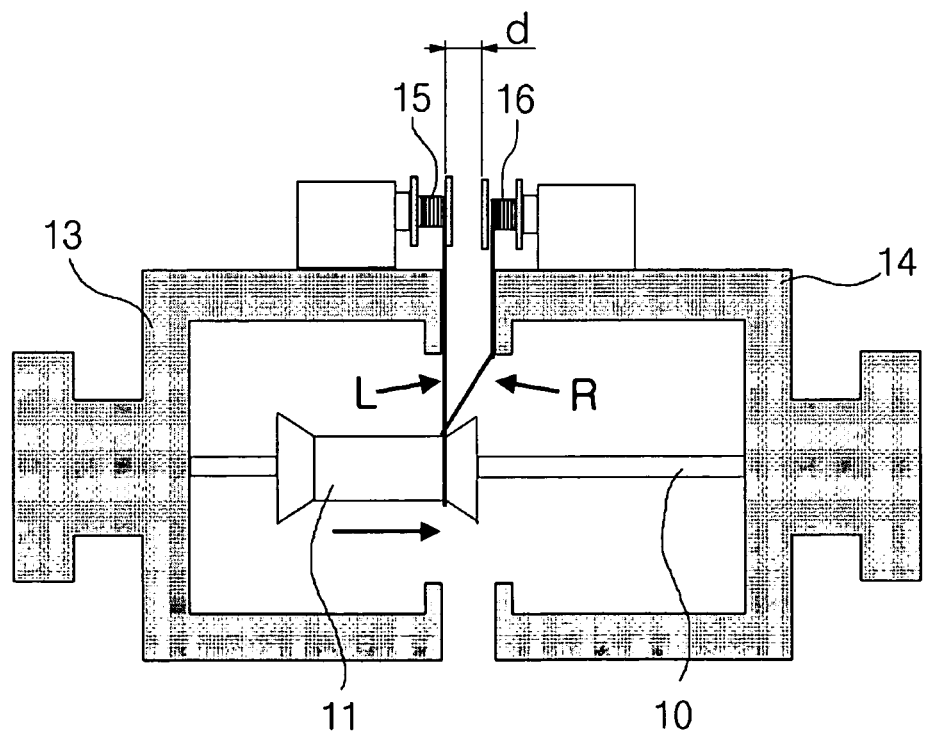
FIGS. 2A through 2D are views illustrating a procedure in which an optical fiber coil is wound on spools in accordance with the present invention.
Figure 2B:
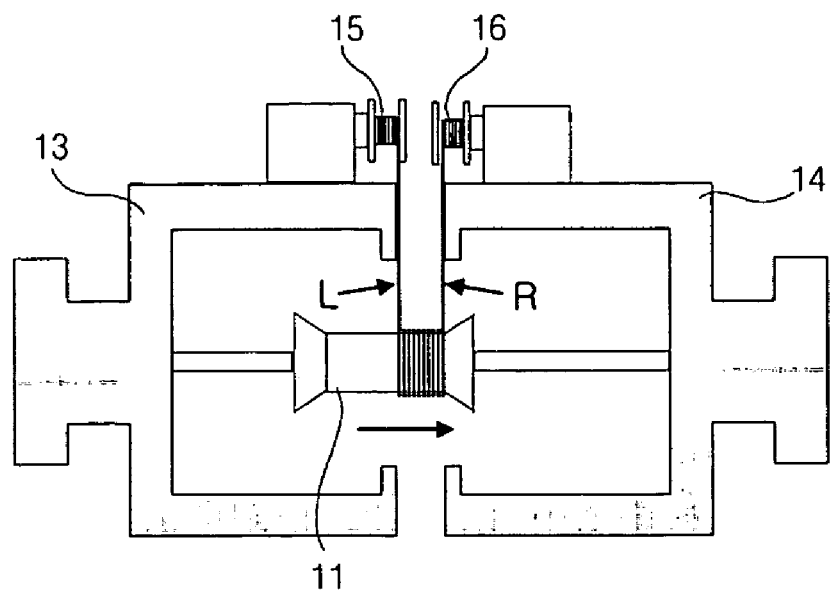
Figure 2C:
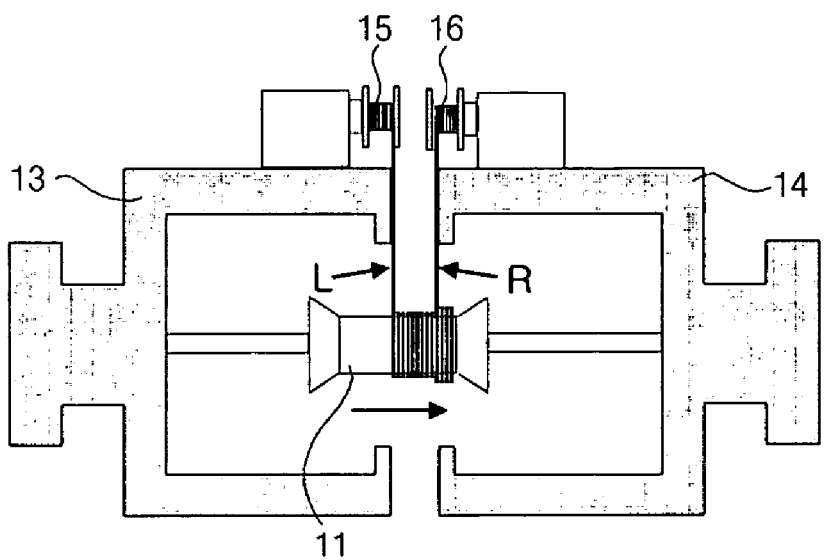
Figure 2D:
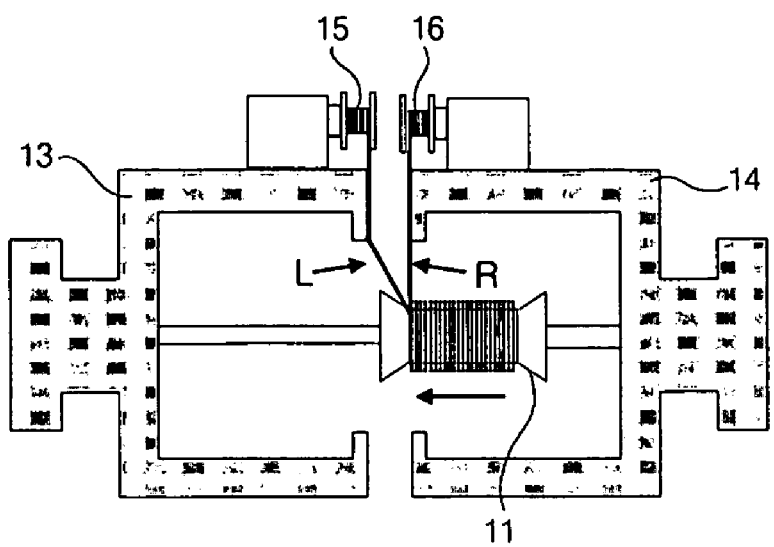

A procedure in which the left winding disk 13 is rotated and the right winding disk 14 is stopped to allow only one half of the optical fiber 'L' released from the left reel 15 to be wound on the spool 11 is continued until the right end of the spool 11 is aligned with the right reel 16. In the state shown in FIG. 2B, the left winding disk 13 is continuously rotated to continuously wind a first layer of the optical fiber toward a left end of the spool 11, and the right winding disk 14 is started to be rotated in a direction opposite to that in which the left winding disk 13 is rotated, to undertake the winding of the other half of the optical fiber 'R' over the first layer to thereby form a second winding layer. As shown in FIG. 2C, the second layer is wound toward the left end of the spool 11 in the same manner as the first layer. In the procedure shown in FIG. 2C, one half and the other half of the optical fiber L and R, which are released from the left and right reels 15 and 16, are simultaneously wound on the spool 11 while forming the first and second winding layers. The procedure shown in FIG. 2C is continued until the left reel 15 is aligned with the left end of the spool 11. If the left reel 15 is aligned with the left end of the spool 11, as can be readily seen from FIG. 2D, the rotation of the left winding disk 13 is interrupted, and only the right winding disk 14 is continuously rotated to complete the formation of the second winding layer. This procedure in which only the right winding disk 14 is continued until the right reel 16 is aligned with the left end of the spool 11 as shown in FIG. 2D.

In this state, the above-described procedures as shown in FIGS. 2A through 2D are repeated to continuously form third and fourth winding layers. In other words, in the state shown in FIG. 2D, the rotation of the left reel 15 is interrupted, and the right reel 16 is continuously rotated to form the third winding layer toward the right end of the spool 11. While the winding operation is continued by the rotation of the right winding disk 14, if the second winding layer proceeding toward the left end of the spool 11 is hindered from further proceeding leftward by the left inclined projection, an optical fiber winding direction is changed to allow a winding layer to be formed toward the right end of the spool 11. Therefore, both of the second and third winding layers are formed by the optical fiber released from the right reel 16. When the left end of the spool 11 is aligned with the left reel 15, the left winding disk 13 begins rotation in a direction opposite to that in which the right winding disk 14 is rotated, to simultaneously form the fourth winding layer over the third winding layer.

Figure 3:
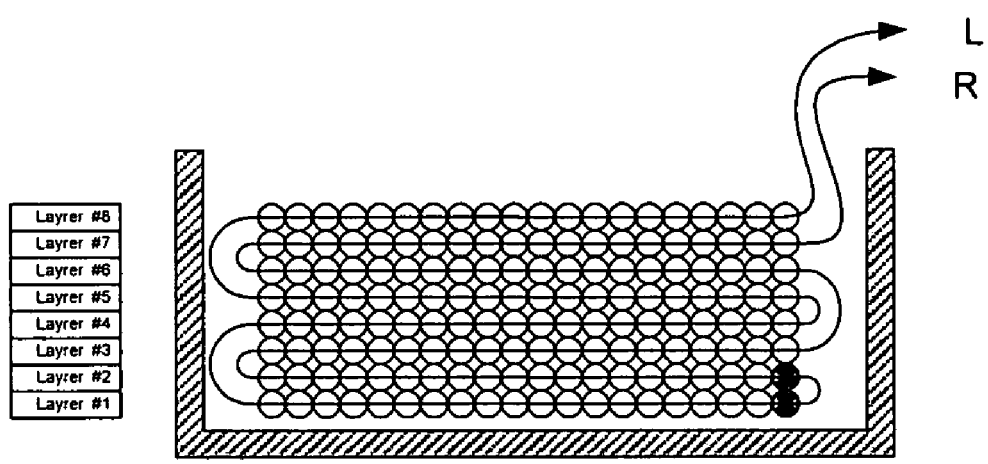
FIG. 3 is a sectional view schematically illustrating a winding pattern of the optical fiber coil in accordance with the present invention.

FIG. 3 is a sectional view illustrating a winding pattern of the optical fiber according to the present invention. As can be readily seen from FIG. 3, the first winding layer is formed on the outer surface of the spool 11 by the left reel 15, and thereupon, the second and third winding layers are formed on the first winding layer by the right reel 16. In the same manner, the forth and fifth winding layers are then formed on the third winding layer by the left reel 15.

In the present invention, the rotational operations of the left and right disks 13 and 14 can be manually controlled while observing a winding state of the spool 11. Also, within the technical concept of the present invention, the rotational operations of the left and right disks 13 and 14 can be automatically controlled by sensing the positions of the spool 11 and a winding layer using sensors, or by calculating the numbers of revolutions of the respective disks 13 and 14 depending upon an interval between the reels 15 and 16 and a thickness of the optical fiber.

As apparent from the above description, the present method provides advantages in that, since it is possible to wind an optical fiber having a substantial length while simultaneously forming two layers, an optical fiber winding time can be shortened, and mass production of an optical fiber sensor coil is made possible. Further, because it is not necessary to alternately fix two reels for paying off the optical fiber to a shaft of a spool on which the optical fiber is wound, when mounting and dismounting the reels to and from disks, the possibility of the optical fiber to be snapped is minimized, and it is possible to uniformly maintain a tensile force applied to the optical fiber. Moreover, as an optical fiber sensor coil producing procedure can be fully automatically controlled, it is possible to wind a desired length of the optical fiber on a sensor coil.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for winding a fiber about a spool, comprising:
   a center shaft supported by a pair of support members, around which the spool is fitted to slide along the axis of the center shaft;
   a first winding disk arranged adjacent to a first end of the spool, the first winding disk adapted to rotate about the center shaft;
   a second winding disk arranged adjacent to a second end of the spool, the second winding disk adapted to rotate about the center shaft;
   a first reel adapted to be detachably mounted on the first winding disk, on which one half of the fiber is wound;
   a second reel adapted to be detachably mounted on the second winding disk, on which the other half of the fiber is wound, the second reel being spaced apart from the first reel by a predetermined interval when both reels are mounted on the winding disks;
   driving mechanism adapted to rotate first and second winding disks about the center shaft to wind the fiber about the spool;
   the driving mechanisms adapted to hold the second winding disk fixed until the one half of the fiber on the first reel has been wound about the spool by rotating the first winding disk to shift the spool by about the predetermined interval when the fiber is wound from the second end to the first end of the spool; and
   the driving mechanisms adapted to hold the first winding disk fixed until the other half of the fiber on the second reel has been wound about the spool by rotating the second winding disk to shift the spool by about the predetermined interval when the fiber is wound from the first end to the second end of the spool.

2. The apparatus as set forth in claim 1, wherein a pair of inclined projections is formed at both ends of the spool, respectively, to delimit a winding range of the fiber.

3. The apparatus as set forth in claim 1, wherein a pair of balancing members are secured to the facing surfaces of the winding disks so that the balancing members are positioned opposite to the reels, respectively, around the center shaft.

4. The apparatus as set forth in claim 1, wherein the driving mechanisms further adapted to get the spool to reciprocate along the axis of the center shaft.

5. The apparatus of claim 1 wherein the first winding disk rotates in a direction and the second winding disk rotates in an opposite direction.

6. A method for winding an optical fiber in the form of a quadrupole for forming a sensor coil of a fiber optic gyroscope, comprising the steps of:
   (a) winding both halves of the optical fiber on first and second reels which are mounted to first and second winding disks, respectively;
   (b) setting the optical fiber extending from the respective reels on a spool which is positioned between the first and second winding disks;
   (c) aligning the first reel with one end of the spool and the second reel outward of said one end of the spool, and rotating in a first direction the first winding disk to which the first reel is mounted, so that the optical fiber wound on the first reel is started to be wound on the spool toward a middle part of the spool to form a first winding layer;
   (d) when the second reel is aligned with one end of the spool, rotating the second winding disk to which the second reel is mounted in a second direction opposite to the first direction so that a second winding layer is simultaneously formed on the first winding layer;
   (e) when the first winding layer formed by the first winding disk reaches the other end of the spool, interrupting the rotation of the first winding disk, and continuously rotating the second winding disk until the second winding layer reaches the other end of the spool to complete formation of the first and second winding layers; and
   (f) repeating the steps (c) through (e) in a reverse order to simultaneously form third and fourth winding layers on the first and second winding layers.

7. The method as set forth in claim 6, wherein a pair of inclined projections is formed at both ends of the spool, respectively and another winding layer is started to be formed in an opposite direction when a winding layer reaches any one of the inclined projections.

8. The method as set forth in claim 6, wherein rotation of the first and second winding disks is automatically controlled depending upon positions of the spool and winding layers which are detected by sensors.

* * * * *